(12) United States Patent
Wolfs

(10) Patent No.: US 7,035,376 B2
(45) Date of Patent: Apr. 25, 2006

(54) X-RAY EXAMINATION APPARATUS AND METHOD

(75) Inventor: Peter Bas Anton Wolfs, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 28 days.

(21) Appl. No.: 10/498,178

(22) PCT Filed: Dec. 2, 2002

(86) PCT No.: PCT/IB02/05090

§ 371 (c)(1),
(2), (4) Date: Jun. 9, 2004

(87) PCT Pub. No.: WO03/050567

PCT Pub. Date: Jun. 19, 2003

(65) Prior Publication Data

US 2005/0018812 A1 Jan. 27, 2005

(30) Foreign Application Priority Data

Dec. 11, 2001 (EP) .................................. 01204832

(51) Int. Cl.
*H05G 1/44* (2006.01)

(52) U.S. Cl. ..................................................... 378/108
(58) Field of Classification Search ................ 378/108, 378/98.7, 97
See application file for complete search history.

(56) References Cited

U.S. PATENT DOCUMENTS

| 4,097,741 | A | * | 6/1978 | Pfeiler et al. ................. 378/97 |
| 4,423,521 | A | * | 12/1983 | Haendle et al. ............. 378/108 |
| 5,509,044 | A | * | 4/1996 | Horbaschek ................. 378/97 |

FOREIGN PATENT DOCUMENTS

DE          31 06 627 A1     2/1981

* cited by examiner

Primary Examiner—Edward J. Glick
Assistant Examiner—Jurie Yun
(74) Attorney, Agent, or Firm—Douglas B. McKnight

(57) ABSTRACT

An X-ray examination apparatus and method that provides fast and accurate control of the X-ray dose by combining a fast and inaccurate sensor dose signal for an X-ray sensor and a slow and accurate detector dose signal from an X-ray detector. The combination of the signals takes into account the delay between the two signals so that they are measured at essentially the same time.

9 Claims, No Drawings

X-RAY EXAMINATION APPARATUS AND METHOD

The invention relates to an X-ray examination apparatus, particularly for generating medical X-ray images of a patient for diagnostic purposes, to a corresponding X-ray examination method and to a computer program product.

In many X-ray examination apparatuses an X-ray dose sensing means, e.g. an exposure sensing device or system like an amplimat, is used, which can produce real time measuring information, in particular the current X-ray dose of the X-rays penetrating the object of interest. This X-ray dose sensing means can range from very simple, i.e. spot measuring or integral measuring, to very advanced, depending on the application. Since such an X-ray dose sensing means delivers nearly real time information, it can be used in a fast control loop of an X-ray examination apparatus. This enables fast adjustment to changing conditions, resulting in good dynamic behaviour. Generally, however, real time means have limited accuracy which is evident in the case of spot measuring.

DE 31 06 627 A1 discloses a diagnostic X-ray installation comprising a control loop for the exposure control. Therein a dominant-field-responsive circuit evaluates a video signal provided by an image intensifier television chain and includes a device for blanking-out portions of the video signal for the formation of a dominant field. An actual value transmitter is connected in circuit between the photocathode of the X-ray image intensifier and a high voltage generator therefore, so as to supply to the control circuit an actual value signal corresponding to the mean image brightness. In the control circuit, the actual value signal and the output signal of the dominant-field-responsive circuit are combined as a correction for the dose rate set point value signal, so that the dose rate is controlled in accordance with the selected portion of the video signal corresponding with a desired dominant portion of the image field.

According to the known solution a measuring field functionality is implemented on a device, i.e. the photocathode, which measures only the average video signal level. Further, time effects, i.e. the delay of providing the output signal of the dominant-field-responsive circuit with respect to the actual value signal are not taken into account. Thus, when using the output signal of the dominant-field-responsive circuit as a correction signal for correcting the actual value signal a slow correction signal is used in combination with a fast control loop which will lead to instabilities. Resolving these instabilities by adjusting, i.e. reducing, the speed of the control loop, however, results in a slow reaction to altering exposure conditions and in a slow control loop.

It is an object of the present to provide an improved X-ray examination apparatus and method having a fast and accurate control loop for controlling the X-ray source and thus the actual X-ray dose dynamically in a fast and accurate manner.

This object is achieved by an X-ray examination apparatus as claimed in claim 1 comprising:
an X-ray source for generating X-rays,
an X-ray detecting means for detecting X-rays after penetration through an object of interest providing a detector dose signal accurately indicating the X-ray dose,
an X-ray dose sensing means for measuring the current X-ray dose of the X-rays penetrating the object of interest providing a sensor dose signal indicating the current X-ray dose,
control means for controlling said X-ray source by a control signal being adapted for generating said control signal by correcting said sensor dose signal, said control means comprising:
a storage means for storing a number of values of the last measured sensor dose signal, and
a correcting means for generating a correction signal for correcting the sensor dose signal, said correction signal being generated from the current value of said detector dose signal and the stored value of the sensor dose signal measured at essentially the same time as said value of said detector dose signal.

A corresponding X-ray examination apparatus is claimed in claim 8. The invention relates also to a computer program product comprising program code means for causing a computer to generate said control signal according to said method when said computer program is run on a computer. Preferred embodiments of the X-ray examination apparatus are included in the dependent claims.

The present invention is based on the idea to combine the fast and inaccurate sensor dose signal indicating the current X-ray dose and the slow and accurate detector dose signal accurately indicating the X-ray dose to generate an accurate correction signal for correcting the fast and inaccurate sensor dose signal dynamically so as to finally obtain a fast and accurate control signal for controlling the X-ray source and the X-ray dose. According to the invention a time delay between the sensor dose signal and the detector dose signal due to image processing required by the X-ray detecting means for providing said detector dose signal are taken into account by synchronising these two signals, i.e. the last measured sensor dose signals are stored in storage means. By use of correcting means it will then be made sure that for the generation of the correction signal a current value of the detector dose signal and the corresponding value of the sensor dose signal which has been obtained some time earlier and has been stored in said storage means are used. It is thus assured that both signals indicate the X-ray dose penetrating the object at essentially the same time, even if the detector dose signal is provided to the correcting means with a delay. The correction signal will then be used to correct the current sensor dose signal for controlling the X-ray source and the current X-ray dose. A fast and accurate control loop is thus achieved according to the present invention.

A simple embodiment of the present invention uses a divider for generating said correction signal by dividing the current value of the detector dose signal by the corresponding value of the sensor dose signal, read from said storage means. Said correction signal is further multiplied with the current value of the sensor dose signal using a simple multiplier for generating said control signal.

Preferably, the correction is done via a-low-pass-filter for controlling the dynamic behaviour of said control. The characteristics of said filter are preferably chosen based on a balance between stability and responsiveness of a control loop. If only very slow effects, e.g. outside temperature and pressure, which have an effect on the X-ray dose sensing means, shall be a corrected a very low cut-off frequency can be used.

In the advanced embodiment as claimed in claim 4 an additional dose control algorithm is added for optimal image quality under all circumstances. According to this embodiment an additional adaption signal is generated by said X-ray detecting means by correcting the average grey level value of the detector dose signal, in particular by comparing the value of said detector dose signal of a certain region of interest with an optimal value of the detector dose signal. Said adaption signal is then used to further correct the control signal. The adaption signal generating means of said X-ray detecting means thus particularly make a comparison between the detector grey level for the chosen region of interest on the one hand and the detector grey level for the area which is important for the application on the other hand. Other adaptions are, however, also possible.

The present invention can be applied generally to any kind of X-ray examination apparatus irrespective of what certain components are used therein. Particularly, the X-ray detecting means may comprise an analog X-ray detector and an image intensifier for generating a video signal. Alternatively, also a flat digital X-ray detector may be used. Further, image processing means are provided which then enable the generation of said detector dose signal.

Digital signal processing gives the opportunity to calculate information about optimal exposure conditions. According to a preferred embodiment, the control signal is thus adapted to be used for controlling such X-ray exposure conditions, in particular for adjustment of the illumination or X-ray intensity, the diaphragm size and/or the exposure time. Particularly, the high voltage supply of the X-ray source provided by an high voltage generator is controlled by said control signal.

According to still another preferred embodiment the control means are adapted for generating the control signal by correcting the sensor dose signal with the detector dose signal both resulting from the same region of interest. Thus, the highest accuracy can be achieved.

The invention will now be explained in more detail with reference to the drawing which shows a block diagram of a preferred embodiment of an X-ray examination apparatus according to the present invention. Therein an X-ray source 1 for generating X-rays and an X-ray detector 2 comprising an image intensifier and a TV camera for detecting X-rays after penetration through an object 3, in particular a patient, and for generating a video signal for display are shown. The X-ray source 1, i.e. the X-ray tube, is supplied with high voltage by a generator 4 which shall be controlled according to the present invention.

In the X-ray path between the object 3 and the X-ray detector 2 an X-ray dose sensor 5, preferably an amplimat, is located for measuring the current X-ray dose, which measurement is performed in nearly real time. At the output of said sensor 5 a sensor dose signal $S_N$ is provided indicating said current X-ray dose, where N indicates the frame number of a continuous sequence of frames at which that measurement is performed. Using an "ROI" parameter the selected area, i.e. the region of interest, can be set. The sensor dose signal $S_N$ thus represents the dose rate in the selected area.

The output of the X-ray detector 2 is provided to image processing means 6. Said image processing means 6 comprise means for generating a detector dose signal $I_{N-3}$ from the signal measured by the X-ray detector 2 indicating the accurate X-ray dose. Said image processing means 6 can also be controlled such that said detector dose signal results from the same selected area (region of interest) than the sensor dose signal $S_N$. Since said image processing means 6 operate accurate but slow. The detector dose signal I is provided with a delay with respect to the sensor dose signal S which is indicated by the different indices N and N–3, i.e. the detector dose signal $I_{N-3}$ results from an X-ray dose which has been applied three frames earlier than the X-ray dose resulting in the sensor dose signal $S_N$. It should be noted that the delay of three frames between $I_N$ and $I_{N-3}$ is just an example; in general, the actual delay depends on the delay (in ms) and the frame speed.

According to the invention any deviation between the detector dose signal I and the sensor dose signal S will be used to adjust the sensor dose signal S. A correction signal G is thus generated taking into account that the detector dose signal I is provided with a delay with respect to the sensor dose signal S. This is achieved by storing the last measured values of the sensor dose signal S in a storage means, particularly in a shift register 7. In the present example said shift register 7 comprises four memory units for storing the last four measured values $S_N$, $S_{N-1}$, $S_{N-2}$ and $S_{N-3}$ of said sensor dose signal S since there is a delay of three frames between the detector dose signal I and the sensor dose signal S. The value $S_{N-3}$ will then be compared directly to the present value $I_{N-3}$ of the detector dose signal in a comparator 8 which is preferably a divider dividing $I_{N-3}$ by $S_{N-3}$. Since the shift register 7 is triggered by the detector 2 upon detector exposure it can be made sure that S and I are always synchronized. The output of the comparator 8 is preferably provided to a low-pass filter 9, the characteristics of which can be chosen based on a balance between stability and responsiveness of the control loop. This results in a correction signal $G_{N-3}$ which is then used for X-ray dose adjustment of the next exposure.

For X-ray dose control a control signal $C_N$ is generated by divider 10 dividing the current sensor dose signal $S_N$ with the inverse of the calculated correction signal $G_{N-3}$. Alternatively, a multiplier 10 can be implemented for multiplying $S_N$ with $G_{N-3}$. All signals can be normalized with respect to a target level such that $S_N=1$ means, that it is exactly on target, i.e. no corrections needed from the generator while a value of S<1 means, that the X-ray dose has to be increased, e.g. by increasing the voltage or current value provided by the generator 4 to the X-ray source 1. For this control the control signal $C_N$ can be directly applied to the generator 4.

As a result the sensor 5 will be automatically calibrated once the control loop has stabilized. The signals for generating the correction signal G are synchronized at all times. This implies that a correction stays valid, even after interruption of an exposure run. In equilibrium situation, if the X-ray dose is constant for all images, it holds $S_N=S_{N-3}$ so that the control signal $C_N$ becomes $I_{N-3}$. This means that the accurate detector dose signal controls the X-ray dose. In non-equilibrium situation the sensor dose signal S is corrected with the detector dose signal I which is representative for the percentage dose error found by the accurate detector dose signal. A second correction by $S_{N-3}$ is applied to take account for the fact that in the meantime, i.e. between pulse N and pulse N–3, the sensor 5 has already controlled the generator 4 to correct for X-ray dose errors found in $S_N$ being not equal to 1. Thus, double correction is prevented.

An optional additional control loop comprising elements 11, 12, 13 can further be provided to even more enhance the described control of the X-ray dose. A multiplier 11 is provided for multiplying to the control signal $C_N$ by an adaption signal $A_{N-3}$ generated by said control loop to obtain an enhanced control signal C' controlling the generator 4. In said additional control loop adaption signal generation means 13 are provided making a comparison between the detector grey level for a selected area (region of interest) on the one hand and the detector grey level for the area which is important for the application on the other hand. The selected area could for example exclude highly illuminated areas caused by direct radiation or the like. These high brightness areas may not be relevant to the user, and therefore the effect of this bright area on the average grey level should be corrected for. The adaption signal generating means 13 thus divide an optimal detector grey level signal by the detected grey level signal for the chosen region of interest. The result of said division gives, after low-pass filtering by low-pass filter 12, the adaption signal $A_{N-3}$ to be multiplied by the control signal $C_N$ by multiplier 11 to obtain the enhanced control signal C'. In said control loop advanced, application dependent correction algorithms can be implemented.

I claim:

1. An X-ray examination apparatus, comprising:
   an X-ray source for generating X-rays;
   X-ray detecting means for detecting X-rays after penetration through an object of interest providing a detector dose signal accurately indicating the X-ray dose;
   X-ray dose sensing means for measuring the current X-ray dose of the X-rays penetrating the object of interest providing a sensor dose signal indicating the current X-ray dose;
   control means for controlling said X-ray source by generating a control signal from a corrected sensor dose signal, said control means comprising:
   storage means for storing a number of values of the last measured sensor dose signal, and
   correcting means for generating a correction signal for correcting the sensor dose signal, said correction signal being generated from the current value of said detector dose signal and the stored value of the sensor dose signal measured at essentially the same time as said value of said detector dose signal.

2. An X-ray examination apparatus as claimed in claim 1, wherein said correcting means comprises a divider for dividing said value of said detector dose signal by said value of sensor dose signal to generate said correction signal, and wherein said control means further comprises a multiplier for multiplying said correction signal with the current value of said sensor dose signal.

3. An X-ray examination apparatus as claimed in claim 1, wherein said correcting means further comprises a low-pass filter for controlling the dynamic behavior of said control.

4. An X-ray examination apparatus as claimed in claim 1, wherein said X-ray detecting means further comprises an adaption signal generating means for generating an adaption signal for correcting said control signal by correcting the average grey level value of said detector dose signal, and wherein said control means further comprises an adaption means for correcting said control signal with said adaption signal.

5. An X-ray examination apparatus as claimed in claim 1, wherein said X-ray detecting means comprises an analog X-ray detector and an image intensifier or a flat digital X-ray detector and image processing means for generating said detector dose signal.

6. An X-ray examination apparatus as claimed in claim 1, wherein said control signal controls X-ray exposure conditions, the exposure condition being at least one condition selected from the group consisting of X-ray intensity, diaphragm size, and exposure time.

7. An X-ray examination apparatus as claimed in claim 1, wherein said control means generates said control signal by correcting said sensor dose signal with said detector dose signal both resulting from the same region of interest.

8. An X-ray examination method,
   wherein X-rays generated by an X-ray source are detected by an X-ray detecting means after penetrating through an object of interest, said X-ray detecting means providing a detector dose signal accurately indicating the X-ray dose,
   wherein the current X-ray dose of the X-rays penetrating the object of interest are measured by an X-ray dose sensing means providing a sensor dose signal indicating the current X-ray dose, and
   wherein a control signal for controlling said X-ray source is generated by control means by correcting said sensor dose signal, wherein a number of values of the last measured sensor dose signal are stored in storage means, and a correction signal for correcting the sensor dose signal is generated by correcting means from the current value of said detector dose signal and the stored value of the sensor dose signal measured at essentially the same time as said value of said detector dose signal.

9. A computer program product comprising program code means for causing a computer to generate said control signal according to said method as claimed in claim 8 when said computer program is run on a computer.

* * * * *